United States Patent
Günther (10) Patent No.: US 12,283,680 B2
(45) Date of Patent: *Apr. 22, 2025

(54) TEMPERATURE CONTROL DEVICE FOR A BATTERY HOUSING

(71) Applicant: Kirchhoff Automotive Deutschland GmbH, Attendorn (DE)

(72) Inventor: Alexander Günther, Olpe (DE)

(73) Assignee: Kirchhoff Automotive Deutschland GmbH, Attendorn (DE)

(*) Notice: Subject to any disclaimer, the term of this patent is extended or adjusted under 35 U.S.C. 154(b) by 1492 days.

This patent is subject to a terminal disclaimer.

(21) Appl. No.: 16/633,282

(22) PCT Filed: Aug. 7, 2018

(86) PCT No.: PCT/EP2018/071427
§ 371 (c)(1),
(2) Date: Jan. 23, 2020

(87) PCT Pub. No.: WO2019/034485
PCT Pub. Date: Feb. 21, 2019

(65) Prior Publication Data
US 2021/0143497 A1    May 13, 2021

(30) Foreign Application Priority Data
Aug. 14, 2017   (DE) .......................... 102017118519.4

(51) Int. Cl.
*H01M 10/6557*   (2014.01)
*H01M 10/613*   (2014.01)
*H01M 10/625*   (2014.01)

(52) U.S. Cl.
CPC ..... *H01M 10/6557* (2015.04); *H01M 10/613* (2015.04); *H01M 10/625* (2015.04); *H01M 2220/20* (2013.01)

(58) Field of Classification Search
None
See application file for complete search history.

(56) References Cited

U.S. PATENT DOCUMENTS

| 10,424,770 B2 | 9/2019 | Günther |
| 11,075,416 B2 * | 7/2021 | Günther .............. H01M 50/204 |

(Continued)

FOREIGN PATENT DOCUMENTS

| CN | 101847762 | 9/2010 |
| DE | 19648353 A1 | 5/1998 |

(Continued)

OTHER PUBLICATIONS

Examination report dated Oct. 24, 2022 in related German application No. DE 10 2017 118 509.4.

(Continued)

*Primary Examiner* — Maria Laios
(74) *Attorney, Agent, or Firm* — Polson Intellectual Property Law P.C.; Margaret Polson; Christopher Sylvain (57) ABSTRACT

A temperature control device of a battery housing for a vehicle which is driven by an electric motor. The temperature control device is divided into multiple temperature control cells, and each temperature control cell has a heat exchange surface for transferring heat from a battery module, which is inserted into the temperature control cell and which is to be temperature-controlled, into the temperature control device or vice versa and at least one temperature control agent channel, which is arranged at a distance from the heat exchange surface, through which a fluid can flow, and which is fluidically connected to a first temperature control agent collector on the inlet side and to a second temperature control agent collector on the outlet side. The inlet or outlet connection of the first temperature control agent collector and the outlet or inlet connection of the second temperature control agent collector are arranged on (Continued)

the temperature control agent collector end portions facing in the same direction, and one of the two temperature control agent collectors is designed to have multiple channels. The temperature control agent channels of the temperature control cells open into a first collector channel of said temperature control agent collector, and the collector channel is provided with an additional collector channel, through which the temperature control agent is conducted in counter-current to the first collector channel, in order to be fluidically connected to the inlet or outlet connection of said temperature control agent collector. The heat exchange surface of the temperature control device is connected to the base on the lower face or to an intermediate base of a battery housing on the upper face, or the part of the temperature control device is the base of a battery housing, and each of the battery modules to be temperature-controlled lies on the heat exchange surface of a respective temperature control cell.

10 Claims, 5 Drawing Sheets

(56) References Cited

U.S. PATENT DOCUMENTS

| | | | | |
|---|---|---|---|---|
| 2010/0147488 | A1* | 6/2010 | Pierre | H01M 10/617 |
| | | | | 165/172 |
| 2012/0177970 | A1* | 7/2012 | Marchio | H01M 50/103 |
| | | | | 429/120 |
| 2015/0200429 | A1 | 7/2015 | Lee et al. | |
| 2016/0344061 | A1* | 11/2016 | Maguire | H01M 10/613 |
| 2019/0036092 | A1 | 1/2019 | Günther | |
| 2019/0229311 | A1 | 7/2019 | Günther | |
| 2019/0252741 | A1 | 8/2019 | Günther | |
| 2019/0259994 | A1 | 8/2019 | Günther | |
| 2019/0273231 | A1 | 9/2019 | Günther | |
| 2019/0337402 | A1 | 11/2019 | Günther | |
| 2019/0381899 | A1 | 12/2019 | Günther | |

FOREIGN PATENT DOCUMENTS

| | | |
|---|---|---|
| DE | 102008014155 A1 | 9/2009 |
| DE | 102009015351 A1 | 9/2010 |
| DE | 102010019478 A1 | 11/2010 |
| DE | 102013021670 A1 | 7/2014 |
| JP | 2012094370 A | 5/2012 |
| WO | 2005080902 A1 | 9/2005 |

OTHER PUBLICATIONS

International Search Report dated Nov. 9, 2018 in parent International application PCT/EP2018/071427.
Written Opinion of the International Searching Authority dated Nov. 9, 2018 in parent International application PCT/EP2018/071427.
U.S. Appl. No. 16/473,996, filed Jun. 26, 2019 (Günther), applicant Kirchhoff Automotive Deutschland GmbH. Per USPTO waiver of Rule 1.98(a)(2)(iii) requirement.
Office Action dated Oct. 12, 2020 in related Chinese application CN201880052573.5.

* cited by examiner

TEMPERATURE CONTROL DEVICE FOR A BATTERY HOUSING

BACKGROUND

The present disclosure relates to a temperature control device of a battery housing for a vehicle driven by an electric motor, which temperature control device is divided into a plurality of temperature control cells, and each temperature control cell has a heat exchanger surface for transferring heat from a battery module, which is inserted therein and which is to be temperature-controlled, into the temperature control device or vice versa, and at least one temperature control agent channel which is spaced apart from the heat exchanger surface and through which fluid can flow, which temperature control agent channel is fluidically connected on the inlet side to a first temperature control agent collector and on the outlet side to a second temperature control agent collector, wherein the inlet or outlet connection of the first temperature control agent collector and the outlet or inlet connection of the second temperature control agent collector are arranged at the end portions of the temperature control agent collectors which point in the same direction, and wherein one of the two temperature control agent collectors is designed to be multi-channel, wherein the temperature control agent channels of the temperature control cells open into a first collector channel of said temperature control agent collector, and said collector channel is provided with a further collector channel, through which the temperature control agent is conducted in counter-current to the first collector channel, in order to be fluidically connected to the inlet connection or outlet connection of said temperature control agent collector.

In vehicles driven by electric motor, such as in passenger cars, forklift trucks or the like, for example, battery modules are used as current accumulators. Such battery modules are typically composed of a plurality of individual batteries. These batteries are so-called high-voltage batteries. There are certain requirements with respect to how such battery modules necessary for operating a vehicle are to be accommodated. It is essential that the battery module or modules are protected in their battery housing from external influences. In addition, the battery module or modules are required to be accommodated in a battery housing so as to be sealed against moisture ingress and prevent condensate formation within the battery housing. Moisture penetrating into the battery chamber of the battery housing can lead to a short circuit, which can trigger a fire of the battery module.

Battery modules which have a high energy and power density are used as electrical energy stores. The battery modules heat up during the charging process and also during the discharging process. This is problematic during rapid charging or discharging processes. Fast charging processes are currently carried out up to 150 kW. Charging processes are intended to be carried out in future even up to 350 kW. In such a rapid charging process, approximately 10% may result in heat output. For this reason, battery housings of electric vehicles are equipped with an active cooling device in many cases to prevent excessive heating of the battery modules. Since the battery modules typically used in the form of lithium-ion cells or lithium-polymer cells can discharge significantly less current at lower temperatures than at higher temperatures, the battery modules are kept in a specific temperature window. Exceeding a certain temperature leads to a noticeably lower service life of the cell or cells of such a battery module. Therefore, the battery module or modules are integrated into an active temperature management system, which cools the battery modules in the event of imminent excessive heating and heats them when a temperature is too low. With regard to a temperature management system of such battery modules, cooling is paramount since excessive heating can lead to a reduction in service life and to the destruction of the battery modules.

For the purpose of cooling battery modules accommodated in a battery housing for such purposes, temperature control devices are used as are known, for example, from DE 10 2013 021 670 A1. This previously known temperature control device, designed as a bar-type heat sink, has a coolant collector on the inlet side and a coolant collector on the outlet side. The two coolant collectors are spaced apart from one another and are connected to one another by coolant channels. The upper side of the cooling channels facing the battery modules forms a heat exchanger surface, against which the battery modules to be cooled bear. The two coolant collectors are spaced apart from each other such that a plurality of battery modules adjacent to one another can be arranged thereon in each case. The heat exchanger surface of this prior art is structured to receive the battery modules by means of an asymmetrical wave form. Each row of battery modules is arranged in a temperature control cell of this previously known heat sink. Conceptually speaking, the heat sink previously known from said document is a bar-type heat sink.

In addition to temperature control devices which are constructed according to the principle of bar-type heat sinks, those in which the temperature control agent channel or channels are arranged to meander over the surface of the panel are also used.

DE 10 2008 014 155 A1 discloses a modular battery system having a cooling system of the type described above. There is a heat sink in each case between two rows of battery modules, against which heat sink the round cooling battery modules bear with their outer surface in correspondingly contoured receptacles. These heat sinks are connected on the one side to an inflow collector and on the other side to an outflow collector, wherein the inflow collector and the outflow collector are acted upon by the same side of the battery system. The longitudinal extension of the individual cells of a battery module extends in the transverse direction with respect to the orientation of the collectors connected to the ends of each heat sink. The individual cells of such a battery module are held together by tensioning straps with the heat sink disposed between the two cell rows. The heat sinks disposed between two rows of battery modules are thus used as carriers for the battery modules. One enclosure is required in a housing so that battery modules can be used in vehicles. Owing to the design of the cooling system, integration of this previously known modular battery system into a housing, in particular in such a way that the battery modules or the cells can easily be removed, is not provided and is only possible with a high degree of disassembly effort.

In addition to the mentioned temperature management system, it is also desirable for the individual battery modules accommodated in the battery housing to be kept as much as possible at a same temperature so that the battery modules used in such a battery housing undergo uniform ageing. In addition, it is desirable for the battery module temperature management device to be as small as possible.

SUMMARY

Proceeding from this background, an aspect of the present disclosure addresses the problem of further developing a temperature control device of the aforementioned type in such a way that it can be not only as small as possible and easy to assemble with respect to its individual components, but in which the battery modules can also be easily removed or inserted.

This problem is solved with a temperature control device of the type in question, in which the temperature control device is connected with its heat exchanger surface on the underside to the base or on the upper side to an intermediate base of a battery housing, or part of the temperature control device is the base of a battery housing, and the battery modules to be temperature-controlled bear against the heat exchanger surface of a temperature control cell in each case.

A temperature control device of this kind is constructed in the manner of a bar-type heat sink. In contrast to previously known temperature control devices according to DE 10 2013 021 670 A1, which are designed as bar-type heat sinks, the connections (inlet connection and outlet connection) of the two temperature control agent collectors are disposed on the same end portions and thus on the same side of the temperature control device. As a result, a connection of the temperature control device in the vehicle to the temperature control medium circuit is considerably simplified. In this concept, the two connections can thus be arranged on an impact-protected side of the battery module, which increases operational reliability. A special feature of this temperature control device is that, although the connections of the temperature control agent collectors are arranged on the end portions facing in the same direction, uniform flow through the temperature control agent channels of the temperature control cells connected thereto and thus uniform cooling of the battery modules arranged in the temperature control cells are not impaired. This is achieved in that one of the two temperature control agent collectors is designed to be multi-channel, i.e. having at least two channels, wherein the temperature control agent channels of the temperature control cells open into a first collector channel. However, this collector channel is not in direct fluid connection with the inlet or outlet connection of said temperature control agent collector. This purpose is served by a further collector channel of said temperature control agent collector, through which there is flow in counter-current to the temperature control agent conveyed from the temperature control agent channels into the first collector. The first collector channel of such a temperature control agent collector is in fluid connection with the further collector channel via an end-side fluid diversion. The fluid diversion is typically disposed at the end of the temperature control agent collector opposite the inlet and outlet connections. Thus, in such a temperature control device, uniform flow, known from conventional temperature control devices designed in the manner of bar-type heat sinks, is guaranteed through the temperature control agent channels of the temperature control cells, although the two temperature control agent collectors have their connection at the same end portions.

Such a temperature control device is an integral component of a battery housing, in particular in that the temperature control device is connected to the base plate and/or the frame of the battery housing.

This concept also has the advantage that the temperature control device is additionally reinforced by the formation of the temperature control agent collector comprising a plurality of collector channels. The temperature control agent collectors can be mounted on the temperature control agent channels of the individual temperature control cells, for example as part of temperature control panels, in the same manner as is known from conventional bar-type heat sinks. As a result, the assembly effort for producing such a temperature control device is not increased with respect to conventional ones. Rather, mounting of this kind is made easier since the inlet and outlet connections of the temperature control device are on the same side.

In order to form a fluid connection between the first collector channel and the further collector channel, according to one embodiment, said fluid connection is provided by an end-side closure of the collector channels, wherein, for the end-side connection of the two collector channels, the partition, otherwise separating the collector channels, has an opening or is removed in some regions. Such a closure can be provided by a closure piece connected to the end side of the temperature control agent collector. The temperature control agent channel comprising at least two collector channels can also be provided by a plurality of separate tubes. The above applies accordingly in such a configuration.

Typically, the hydraulic cross-sectional area in the first collector channel and in the further collector channel of the temperature control agent collector comprising a plurality of collector channels is the same. If the further collector channel is fluidically connected to a plurality of first collector channels, according to this embodiment, the hydraulic cross-sectional area of said collector channel is correspondingly larger and then corresponds to the hydraulic cross-sectional area of the sum of the first collector channels. However, it is also possible for the further collector channel to have a different hydraulic cross-sectional area than the first collector channel, into which the temperature control agent channels of the temperature control cells open. Preferably, the hydraulic cross-sectional area of the first collector channel of the one temperature control agent collector is also equal to the hydraulic cross-sectional area of the other temperature control agent collector. The performance of the temperature control can be influenced by the choice of a hydraulic cross-sectional area. However, in order to make the temperature control energy-efficient, the hydraulic cross-sectional areas in the above-described channels are typically the same.

An embodiment is also possible in which the temperature control device has a plurality of rows of temperature control cells extending in parallel, and in which a plurality of temperature control agent channels are connected to a temperature control agent collector arranged between two rows of temperature control cells according to the aforementioned principle. In such an embodiment, the two temperature control agent collectors to which the temperature control agent channels of a row of temperature control cells are connected can then be designed as multi-channel temperature control agent collectors.

The above-described concept of a temperature control device can also be implemented in temperature control devices in which at least two second temperature control agent collectors (two outflow collectors or two inflow collectors) are associated with a first temperature control agent collector (an inflow collector or outflow collector). In such an embodiment, at least two rows of temperature control cells are supplied by the first temperature control agent collector, either as an inflow or as a return flow. The other component in each case—return flow or inflow—is provided via two separate temperature control agent collectors. In a temperature control device designed in this way, either the first temperature control agent collector or the two second temperature control agent collectors can be designed to be correspondingly multi-channel so that the respective connections can be arranged in the portions pointing in the same direction.

A particular advantage of the temperature control agent device according to the present disclosure is that it can also be realized by a two-shell construction, wherein one of the two shells can be an unstructured plate, for example the base plate delimiting one or more rows of temperature control cells on the underside, while the complementary shell is provided by a structural shell which is connected to the base plate in a medium-tight manner. The structural shell has channels which correspond to the desired fluid pathways and which form closed channels by the connection of the structural plate to the base plate. A structural plate of this kind can be produced cost-effectively, for example, as a stamped metal plate, for example a steel plate. The unstructured plate may also be a separate plate that is not necessarily the base plate of a battery housing. Such a temperature control agent device can also be provided by two channels having the desired fluid pathways.

BRIEF DESCRIPTION OF THE DRAWINGS

The present disclosure is described below on the basis of depicted embodiments with reference to the accompanying figures. The drawings show the following.

DETAILED DESCRIPTION

Figure 1:
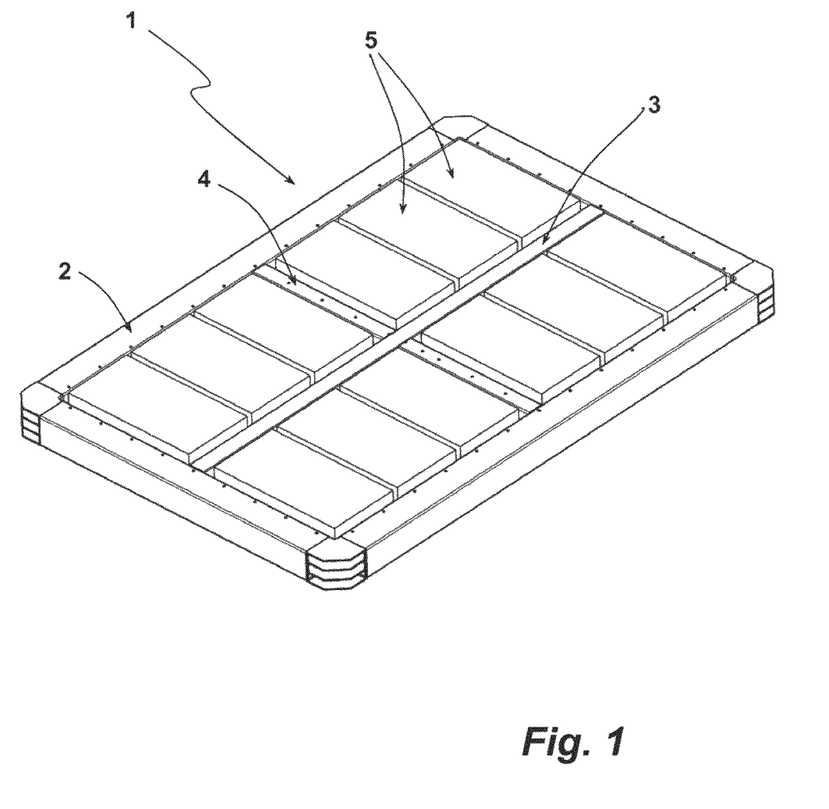
FIG. 1 shows a perspective view of a battery housing having two rows of temperature control cells equipped with battery modules, with a cover removed, and a temperature control device according to the present disclosure.

A battery housing 1 with a removed cover (not shown) is shown in FIG. 1 and thus permits a view into same. The battery housing 1 comprises a peripheral structural frame 2, which is composed of individual frame segments. The structural frame 2 is reinforced by an internal longitudinal member 3 and an internal cross member 4. The battery housing 1 has a temperature control device, which is explained below. The temperature control device has a plurality of temperature control cells. A battery module 5 is inserted into each temperature control cell. Each temperature control cell is designed as a cooling panel 7, which provides a planar heat exchanger surface facing into the interior of the battery housing 1. At least one temperature control agent channel is integrated in each panel 7 at a distance from the heat exchanger surface on which the battery modules 5 rest. In the embodiment shown, two temperature control agent channels 8 extending parallel to one another are integrated into each panel.

As a result of the division of the inner volume of the battery housing 1 by the longitudinal member 3, two rows of battery modules and, consequently, also two rows of temperature control cells are provided.

Figure 2:
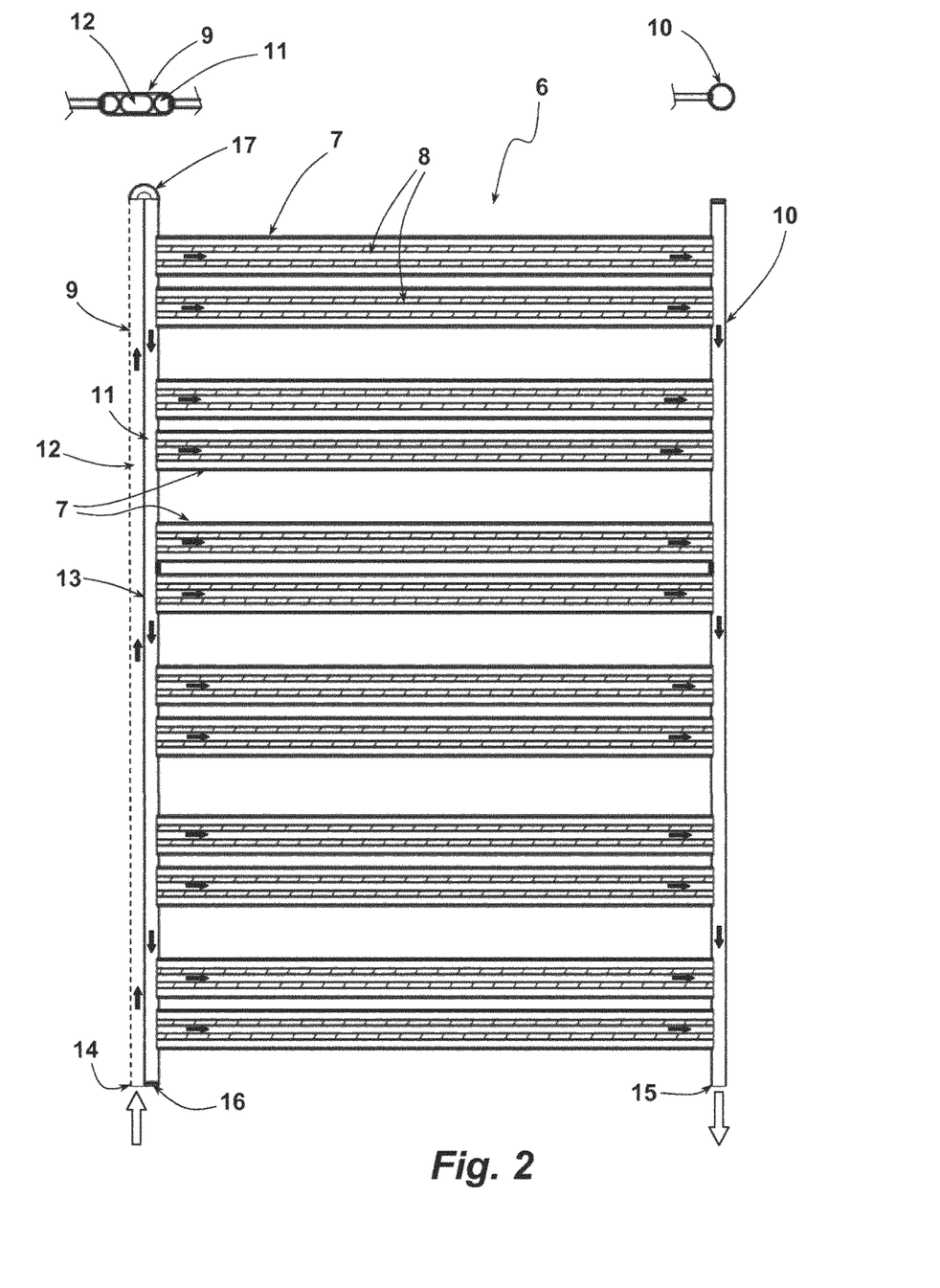
FIG. 2 shows a schematic section for illustrating the mode of operation of the temperature control device of the battery housing from FIG. 1 with respect to a row of temperature control cells.

FIG. 2 shows a schematic section through the temperature control device 6 forming the base of the temperature control cells. The temperature control agent channels 8 of each temperature control panel 7 are arranged parallel to one another and open with their one end into a first temperature control agent collector 9 and with their other end into a second temperature control agent collector 10. In the embodiment shown, the temperature control agent collector 9 constitutes the inflow collector. The temperature control agent collector 10 forms the outflow collector. The first temperature control agent collector 9 is multi-channel with respect to the right row of temperature control cells shown in FIG. 2, specifically with three channels in the embodiment shown. Since the temperature control agent channels 8, 8.1 of the two rows of temperature control cells are supplied by the temperature control agent collector 9, the latter has two collector channels 11, 11.1, to which the temperature control agent channels 8, 8.1 of the two temperature control cell rows are connected. The collector channel 12 supplies the collector channels 11, 11.1 with temperature control fluid. In order to explain the functional principle, the mode of operation is first explained below on the basis of the right row of temperature control cells shown in FIG. 1, before the entire temperature control device 6 is subsequently described in more detail with reference to FIG. 3. The following designs of the row of temperature control cells of the temperature control device 6 shown in FIG. 2 apply similarly to the configuration of the left row of temperature control cells of the temperature control device 6.

The two collector channels 11, 12 of the temperature control agent collector 9 are separated from one another by a partition 13. They are shown in an enlarged cross-sectional view above the two temperature control agent collectors 9, 10 in FIG. 2. Only half the cross-sectional area of the collector channel 12 is used for supplying the collector channel 11. Temperature control agent flows in counter-current flow through the two collector channels 11, 12 of the temperature control agent collector 9. The inlet connection of the temperature control agent collector 9 is disposed at the end thereof indicated by the reference sign 14 in FIG. 2. The outlet connection of the second temperature control agent collector 10 used as an outflow collector is also disposed at the end 15 facing in the same direction. The collector channel 11 is closed by a plug 16 at the end 14 of the temperature control agent collector 9. The end of the temperature control agent collector 9 opposite the end 14 is closed by a diversion piece 17. The collector channel 11 is fluidically connected to the collector channel 12 via the diversion piece 17. The temperature control agent introduced into the first temperature control agent collector 9 via the inlet connection at the end 14 thus first flows through the collector channel 12 until the temperature control agent flows through the diversion piece 17 into the collector channel 11 and then into the temperature control agent channels 8 of the temperature control panels 7 connected therein. A particularity of this temperature control device 6 is that the two inlet and outlet connections are arranged at the ends 14, 15 of the two temperature control agent collectors 9, 10 facing in the same direction and, nevertheless, a uniform flow with respect to cooling capacity is guaranteed through the temperature control agent channels 8 of the temperature control panels 7.

FIG. 2 shows the functional principle of a temperature control device according to the present disclosure, specifically on the basis of the mode of operation of the temperature control device 6 of the battery housing 1 in the region of the right row of battery modules or row of temperature control cells. The flow through the temperature control device 6 is indicated by block arrows. The battery housing 1 actually has two rows of temperature control cells. For this reason, the complete temperature control device 6 shown in FIG. 3 actually has two rows of temperature control panels, the first temperature control agent collector 9 having, in addition to its collector channel 12 connected at its end 14 to the inlet connection, two parallel collector channels 11, 11.1, wherein the temperature control agent channels 8 of the two rows of temperature control cells open into each of said two collector channels 11, 11.1. Above the central temperature control agent collector 9, its cross-sectional geometry is shown in an enlarged representation, from which the arrangement of the collector channel 12 and of the two collector channels 11, 11.1 can be clearly seen. The hydraulic cross-sectional area of the collector channel 12 of the temperature control agent collector 9 supplying the two collecting channels 11, 11.1 is twice as large as the hydraulic cross-sectional area of each collector channel 11 or 11.1, which in turn have the same hydraulic cross-sectional area. The two collector channels 11, 11.1 are closed at the end 14 by a plug 16, 16.1. The deflecting body 17 is designed so that temperature control agent introduced into the collector channel 12 is conducted in equal amounts into each collector channel 11 and 11.1.

Figure 3:
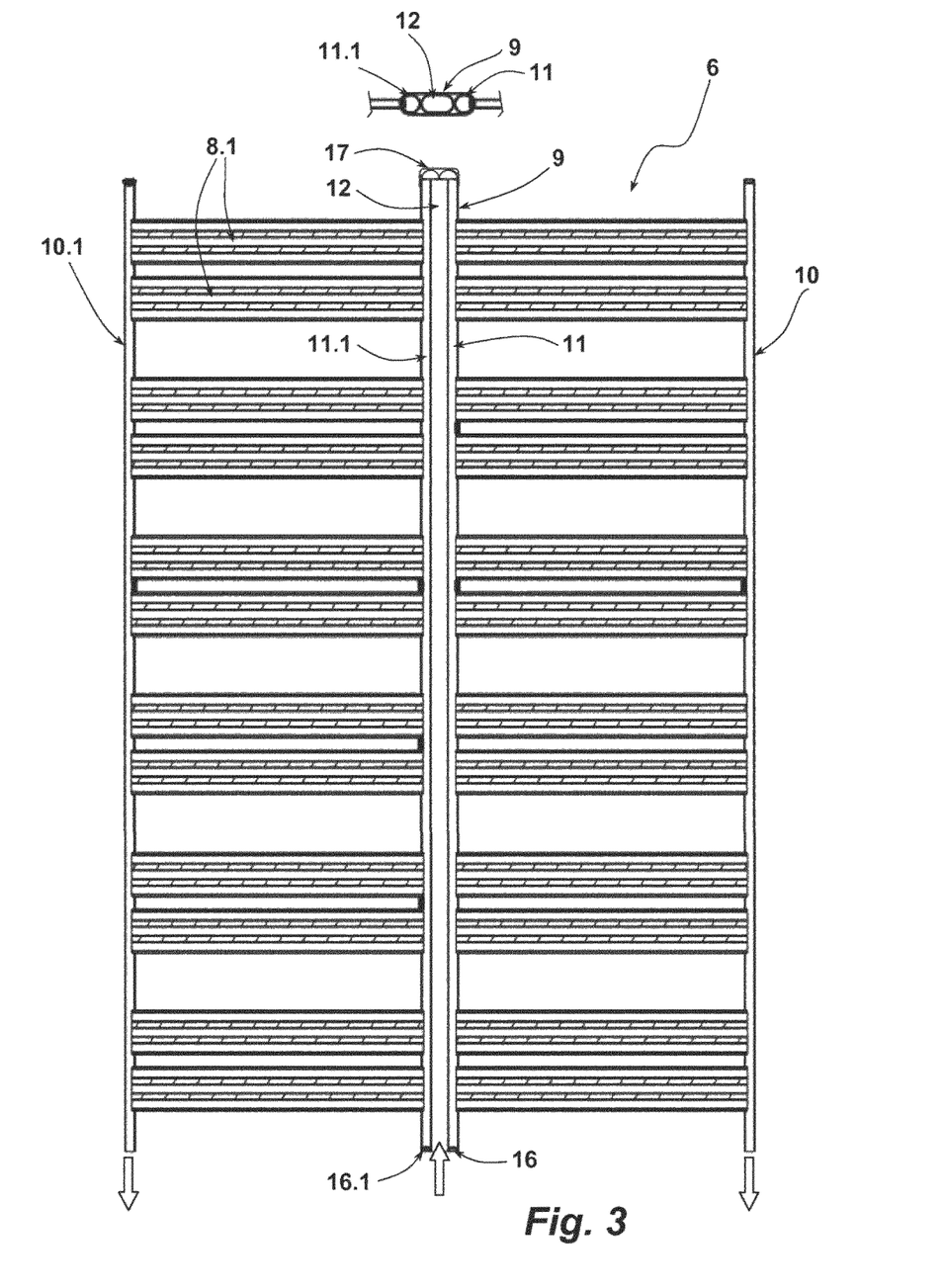
FIG. 3 shows a view corresponding to that of FIG. 2 with a section through the complete temperature control device of the battery housing from FIG. 1.

The hydraulic cross-sectional area of the channels of the inflow and outflow collector connected by temperature control agent channels 8, 8.1, in particular in the embodiment shown, and the hydraulic cross-sectional area of the temperature control agent collectors 10 or 10.1 and that of the collector channel 11 or 11.1 are the same size. This should be considered in light of a pressure loss between the inflow side and the outflow side in a dynamic system, as in the present case, when fluid flows through the temperature control device 6. The greater the flow velocity, the greater the pressure loss. In the embodiment shown, the cross-sectional geometry of the temperature control agent collectors 10, 10.1 and of the collector channels 11, 11.1 is circular since this provides the lowest resistance for a fluid flowing therein. The same dimensioning of those channels to which the temperature control agent channels 8, 8.1 of the temperature control cells are connected ensures the same pressure loss over all the temperature control agent channels and thus a uniform throughflow.

The collector channel 12, supplying the two collector channels 11, 11.1, of the temperature control agent collector 9 used as an inflow collector can indeed have a larger hydraulic cross-sectional area than the sum of the cross sections of the collector channels 11, 11.1 without this affecting a uniform supply of the temperature control agent channels 8 or 8.1. In the embodiment shown, the hydraulic cross-sectional area of the collector channel 12 corresponds to twice the cross-sectional area of the collector channels 11 and 11.1.

Figure 4:
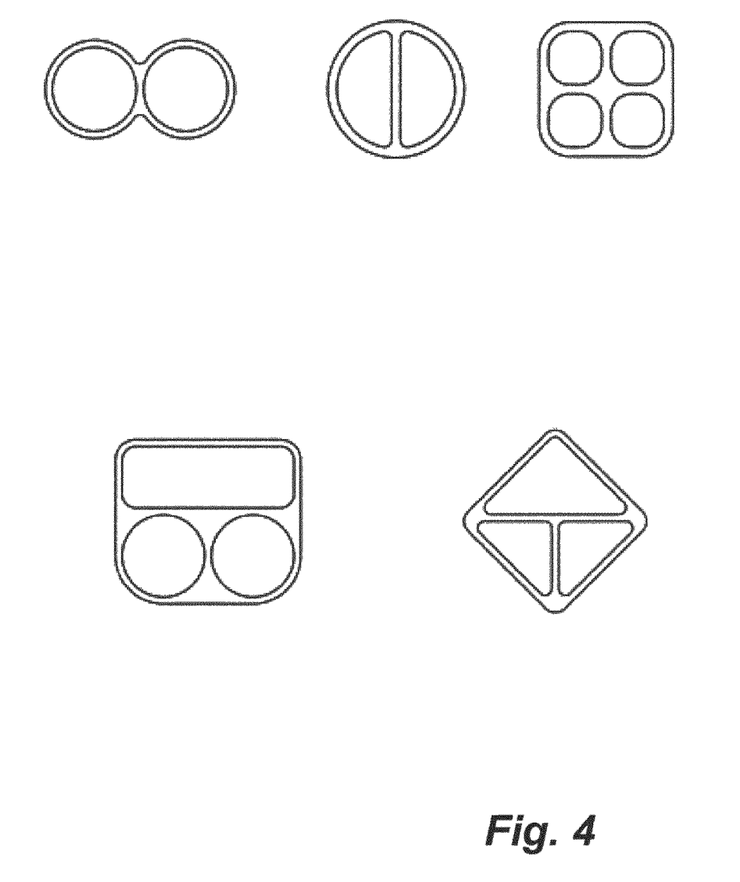
FIG. 4 shows cross-sectional views of different multi-chambered temperature control agent collectors.

FIG. 4 shows five representations of multi-chamber and thus multi-channel temperature control agent collectors. In the temperature control agent collector shown on the left in the first row, the two collector channels are designed with a circular cross-sectional geometry of the same size. The temperature control agent collector of the embodiment shown in the middle of the top row is designed as a round tube having an interior which is divided into two collector channels by a partition following the longitudinal extension. The cross-sectional area of the temperature control agent collector shown on the right in the top row is square with rounded edges. The four collector channels contained therein, which have a uniform cross-sectional area, have the same cross-sectional geometry. A temperature control agent collector having collector channels of different cross-sectional geometry is shown in the bottom row in the two embodiments of FIG. 4.

Figure 5:
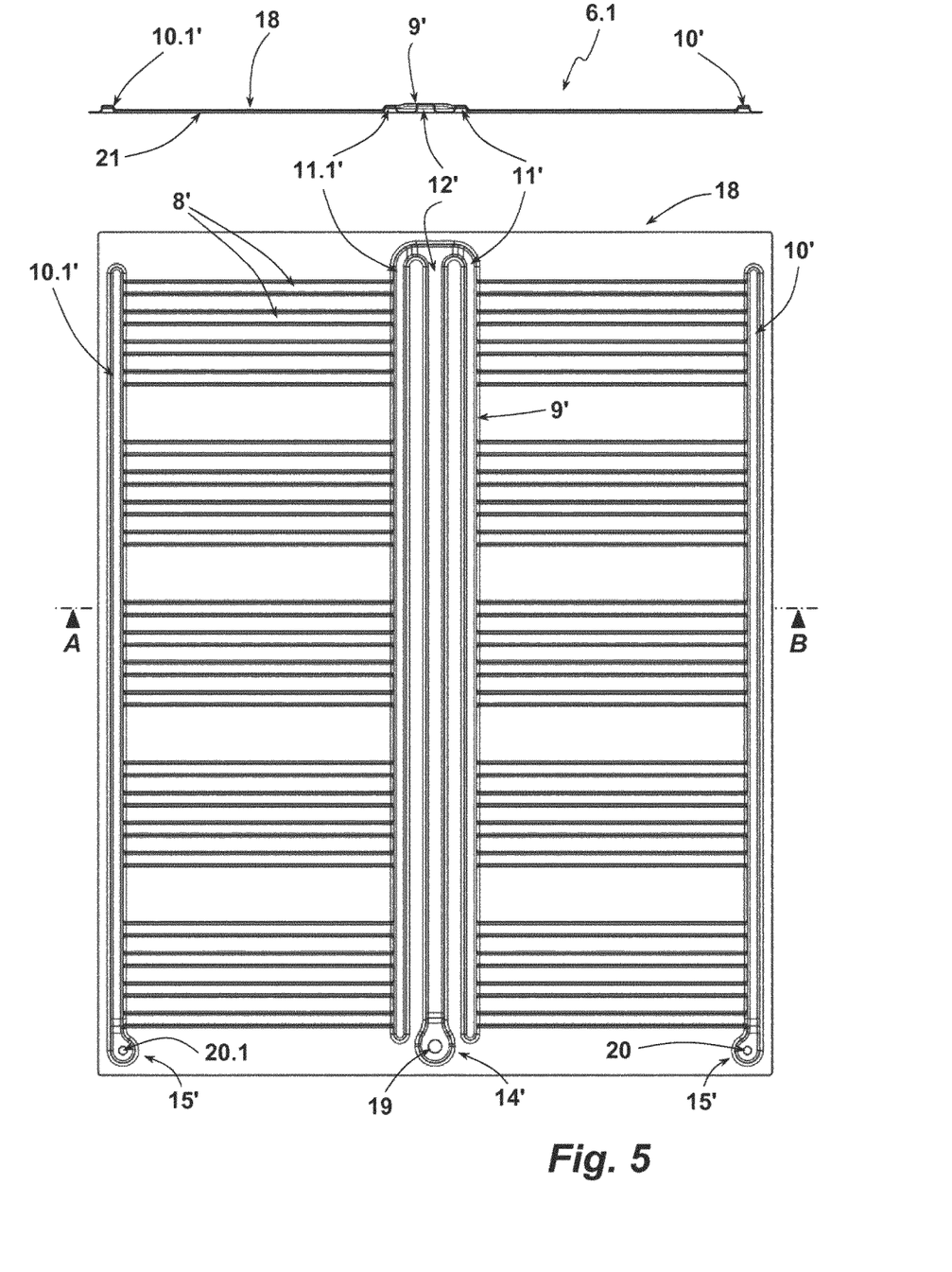
FIG. 5 shows a top view of a structural shell for forming a temperature control device (below) and a sectional view along the line A-B of the top view (above).

FIG. 5 shows a plan view of a structural plate 18 of a further temperature control device 6.1, in which the previously described fluid pathways of the temperature control device are designed as channels. The structural plate 18 is used to construct a two-shell temperature control device 6.1, the other shell of which is formed by the base plate 21 of the temperature control cells. A cross section of this temperature control device 6.1 in an assembly is shown at the top in FIG. 5. The connections 19, 20, 20.1 of the temperature control agent collectors 9', 10', 10.1' are part of the structural plate 18. The inflow collector connection is identified in FIG. 5 by the reference sign 19, and those of the two outflow collectors 10', 10.1' are identified by the reference signs 20, 20.1. The fluid pathways and other parts of the temperature control device 6.1 are otherwise indicated in FIG. 5 by the same reference signs used for the temperature control device 6 of the above-described embodiment, but an apostrophe (') has been added. The advantage of configuring a temperature control device such as the temperature control device 6.1 in two shells is that the fluid pathways can be provided by stamping the structural plate 18 in a single forming step and only the structural plate 18 has to be connected to the base plate 21 to create the temperature control device 6.1, wherein the connection in the channel interspaces is designed to be sealed with respect to the temperature control agent. In principle, the structural plate 18 need not be connected to the entire intermediate channel regions in a sealed manner with respect to the temperature control agent. Point connection is considered to be sufficient. In a configuration of this kind, advantage is cleverly taken of the fact that the fluid will always adopt the flow path with the lowest resistance since the flow resistance over the above-described fluid pathways is significantly lower than a non-sealed intermediate channel region in which the structural plate 18 bears against the base plate 21.

In the embodiments described above, the temperature control device formed or was associated with the base of the battery housing in each case. The same concept can also be used to form a cover of a battery housing. A design is also quite possible in which the cover and the base are configured according to one of the above-described concepts.

The invention has been described with reference to depicted embodiments. Without departing from the scope of the present claims, there are numerous other embodiments for a person skilled in the art which allow the invention to be implemented within the scope of the present claims.

LIST OF REFERENCE SIGNS

1 Battery housing
2 Structural frame
3 Longitudinal member
4 Cross member
5 Battery module
6, 6.1 Temperature control device
7 Temperature control panel
8, 8.1, 8' Temperature control agent channel
9, 9' First temperature control agent collector
10, 10.1, 10', 10.1' Second temperature control agent collector
11, 11.1, 11', 11.1' Collector channel
12, 12' Collector channel
13 Partition
14, 14' End 15, 15' End
16, 16' Plug
17 Diversion piece
18 Structural plate
19 Connection
20, 20.1 Connection
21 Base plate

The invention claimed is:

1. A temperature control device of a battery housing for a vehicle driven by an electric motor, comprising:
a plurality of temperature control cells, each temperature control cell having a heat exchanger surface for transferring heat from a battery module, which is inserted therein and which is to be temperature-controlled, into the temperature control device or vice versa, and at least one temperature control agent channel spaced apart from the heat exchanger surface and through which fluid can flow, wherein the at least one temperature control agent channel is fluidically connected on one side to a first temperature control agent collector and on another side to a second temperature control agent collector,
wherein an inlet or outlet connection of the first temperature control agent collector and an outlet or inlet connection of the second temperature control agent collector are arranged at end portions of the temperature control agent collectors which point in the same direction, and the first temperature control agent collector has a multi-channel design comprising a first collector channel and a second collector channel, wherein the temperature control agent channels of the temperature control cells open into the first collector channel, and the first collector channel is fluidically connected to the second collector channel, through which fluid is guided in counter-current to the first collector channel, in order to be fluidically connected to the inlet connection or outlet connection of the first temperature control agent collector,
wherein the temperature control device is connected with its heat exchanger surface on an underside to a base or on an upper side to an intermediate base of the battery housing, or part of the temperature control device is the base of the battery housing, and the battery modules to be temperature-controlled bear against the heat exchanger surface of a temperature control cell in each case.

2. The temperature control device of claim 1, wherein the first temperature control agent collector comprising the first and second collector channels has, at an end thereof opposite the inlet or outlet connection thereof, a fluid diversion which connects the first collector channel to the second collector channel.

3. The temperature control device of claim 2, wherein, in order to connect the first collector channel to the second collector channel of the first temperature control agent collector, the first temperature control agent collector carries a diversion piece at the fluid diversion end thereof, by which diversion piece the first collector channel and the second collector channel are placed in fluid connection with one another.

4. The temperature control device of claim 2, wherein the first temperature control agent collector comprising the first and second collector channels is an at least two-chamber hollow profile, and fluid connection of the first collector channel to the second collector channel is provided by an end closure of the first and second collector channels at the fluid diversion end of the first temperature control agent collector and by an opening of a partition separating the first and second collector channels.

5. The temperature control device of claim 1, wherein the hydraulic cross-sectional area in the first collector channel and in the second collector channel is the same.

6. The temperature control device of claim 1, wherein the hydraulic cross-sectional area in the first collector channel of the first temperature control agent collector and the hydraulic cross-sectional area in the second temperature control agent collector are the same.

7. The temperature control device of claim 1, wherein the temperature control device has two second temperature control agent collectors, and each temperature control cell of the temperature control device is connected, without interposition of a temperature control agent channel of another temperature control cell, to the first and one of the second temperature control agent collectors by the at least one temperature control agent channel thereof so that
when the first temperature control agent collector is configured as an inflow collector, supplied fluid is discharged via the second temperature control agent collectors used as return collectors, or
when the first temperature control agent collector is configured as a return collector, fluid supplied via the second temperature control agent collectors used as inflow collectors is discharged via the first temperature control agent collector.

8. The temperature control device of claim 7, wherein the two second temperature control agent collectors each have a multi-channel design with a first collector channel and a second collector channel through which fluid flows in counter-current thereto.

9. The temperature control device of claim 1, wherein the temperature control device with its heat exchanger surface is connected on the upper side to a cover or on the underside to the intermediate base of the battery housing.

10. The temperature control device of claim 1, wherein the temperature control device has a two-shell construction, wherein one shell is provided by a base plate delimiting the temperature control cells on the underside and the other shell is provided by a structural plate providing the fluid pathways as channels, and the two shells are connected to one another in a fluidtight sealed manner at least in some portions.

* * * * *